United States Patent [19]

Kazama et al.

[11] 4,081,493
[45] Mar. 28, 1978

[54] RESIN COMPOSITION HAVING RESISTANCE TO HYDROLYSIS

[75] Inventors: Yoshiteru Kazama; Yuji Suzuki; Yuzo Sumida; Tatsuo Hiraoka; Yasuo Miura, all of Wakayama, Japan

[73] Assignee: Kao Soap Co., Ltd., Tokyo, Japan

[21] Appl. No.: 743,349

[22] Filed: Nov. 19, 1976

[30] Foreign Application Priority Data

Nov. 21, 1975  Japan .................... 50-139921

[51] Int. Cl.$^2$ ............................. C08L 75/00
[52] U.S. Cl. .............. 260/859 PV; 260/45.75 R
[58] Field of Search .................... 260/859 PV

[56] References Cited

U.S. PATENT DOCUMENTS

| 3,503,932 | 3/1970 | Reuter | 260/75 |
| 3,644,229 | 2/1972 | Butler | 260/2.5 AD |
| 3,711,440 | 1/1973 | Chadwick | 260/47 CB |
| 3,803,098 | 4/1974 | Schmitt | 260/75 NK |

FOREIGN PATENT DOCUMENTS 908,012  10/1962  United Kingdom.

*Primary Examiner*—Paul Lieberman
*Attorney, Agent, or Firm*—Blanchard, Flynn, Thiel, Boutell & Tanis

[57] ABSTRACT

There is provided a resin composition having resistance to hydrolysis, which comprises a polyblend of a polyvinyl chloride resin and polyester-urethane, a lead stabilizer, 0.1 to 4 weight parts, based on 100 parts of the polyblend, of one or more polyhydric alcohols selected from the group consisting of sorbitol, mannitol, erythritol, arabitol, xylitol, dulcitol and pentaerythritol and 0.5 to 10 weight parts, based on the same, of antimony trioxide. The resin composition can be molded into various products.

12 Claims, No Drawings

RESIN COMPOSITION HAVING RESISTANCE TO HYDROLYSIS

BACKGROUND OF INVENTION

1. Field of Invention

This invention relates to a polyblend resin having excellent resistance to hydrolysis, and more particularly it relates to a polyblend composition essentially consisting of a mixture of polyvinyl chloride and polyester-urethane resin, a lead stabilizer and small quantities of antimony trioxide and one or more kinds of polyhydric alcohol selected from the group consisting of sorbitol, mannitol, pentaerythritol, erythritol, arabitol, xylitol and dulcitol.

It is another object of this invention to provide a method for producing a molding from said type of a polyblend composition by adding, in advance to molding, antimony trioxide and one or more kinds of polyhydric alcohols selected from said group in a pre-determined amount to a mixture of a vinyl chloride resin and polyester-urethane resin and then molding the polymer mixture.

It is further object of this invention to provide a molding product obtained from the above mentioned resin composition, which has excellent resistance to hydrolysis.

2. Description of Prior Arts

Lead stabilizers such as tribasic lead sulfate, tribasic lead phosphate, dibasic lead stearate, etc., are commonly used as thermal stabilizers for thermoplastic molding of polyvinyl chloride resins which are widely employed for molding of various kinds of industrial and general materials such as electric wires, leather articles, hoses, etc. It therefore easily comes to mind to use such lead stabilizer for attaining thermal stability in molding of resin blends consisting of polyvinyl chloride resin and polyurethane resin, particularly polyester-urethane resin, but the results of experiments revealed that when a polyblend resin molding formed by adding a lead stabilizer is kept in hot water or in a moist and hot atmosphere, the polyester-urethane resin component undergoes hydrolysis at a high rate, and in some extreme cases, polyester-urethane with number-average molecular weight of several ten thousands might be decomposed into a syrupy oligomer with a molecular weight of several hundreds and could exude to the molding surface or secede from the molding.

For these reasons, it is inexpedient to put said polyblends to practical use under strict conditions such as abovementioned. Even though there are actually few occasions of use under such circumstances, the above-said undesirable effect is gradually accumulated to cause a fatal damage in long-term use if such polyblends are used in articles which are required to have extremely long service life, such as for example electric wires. This holds true with other kinds of articles for different uses although the affected degree may differ from one article to the other.

It is already known that polyester-urethane resins, that is, polyurethane resins containing ester groups, are very poor in resistance to hydrolysis in hot water or under hot and humid conditions, and for the solution of this problem, it has been proposed to add carbodiimide in the composition. (See, for example, Japanese Patent Publication No. 23311/1963; W. Kellert: Journal of the IRI, Vol. 2, No. 1, Jan./Feb., 1968, pp. 26–28; and E. Muller: Die Angewandte Makromolekular Chemie, 14 (1970), pp. 75–86 (Nr. 203)). However, addition of carbodiimide to the blends of polyester-urethane resin and polyvinyl chloride resin does not provide satisfactory improvement of the hydrolytic resistance of the blends. For instance, in the tests conducted by adding 2,2'-dimethyldiphenylcarbodiimide in an amount ranging from 0 to 5 weight parts per 100 weight parts of the polyblend composition, it was found that hydrolysis took place to an excessive degree as a result of 7-day immersion in boiling water as described later in more detail in comparison with reference examples. This could be easily determined by macroscopic observation or by finger touch of surface tackiness. It is to be also noted that carbodiimide is relatively costly, and its use as an additive is not recommendable from the viewpoint of cost performance.

SUMMARY OF INVENTION

The present inventors have eagerly pursued the study on this subject and found that the use of a polyhydric alcohol selected from the group consisting of sorbitol, mannitol, pentaerythritol, erythritol, arabitol, xylitol and dulcitol in combination with antimony trioxide as additive for resin compositions results in a surprisingly high degree of improvement on hydrolytic resistance of the moldings of said resin compositions. This invention is based on such finding.

Thus, there is provided according to the present invention a method of producing polyblend resin moldings with improved resistance to hydrolysis from a polyblend composition composed of a mixture of polyvinyl chloride resin and polyester-urethane resin by using a lead stabilizer, characterized in that, in order to improve the hydrolytic resistance of the moldings, said polyblend composition is molded after adding thereto one or more kinds of polyhydric alcohol selected from the group consisting of sorbitol, mannitol, pentaerythritol, erythritol, arabitol, xylitol and dulcitol and antimony trioxide in the amounts of 0.1 to 4.0 weight parts and 0.5 to 10 weight parts, respectively, per 100 weight parts of said polyblend composition.

Polyester-urethane resins used in this invention are thermoplastic polyurethane resins containing ester groups, and such resins can be obtained by reacting, for example, polyesterdiol or a diol mixture containing polyesterdiol with an organic polyisocyanate.

The term "polyvinyl chloride resin" as used herein refers to all types of resins which can be generally realized as polyvinyl chloride resins in the industries, such as for example vinyl chloride homopolymers, vinyl chloride copolymers, vinyl chloride graftcopolymers, vinyl chloride blockcopolymers, etc. The copolymer of vinyl chloride is preferred to include 60 to 99.9 wt. %, especially 85 to 99.9 wt. %, of vinyl chloride, and the balance is a comonomer such as vinyl acetate, vinylidene chloride, acrylonitrile, ethylene, propylene, diethyl maleate, dibutyl maleate, diethyl fumarate, and (meth)acrylates such as methyl acrylate, ethyl acrylate, methyl methacrylate, and butyl methacrylate.

The effective amount of polyhydric alcohol used in this invention is within the range of 0.1 to 4.0 weight parts, most preferably 0.5 to 4.0 weight parts, per 100 weight parts of the mixture of polyvinyl chloride resin and polyester-urethane resin. A greater amount of addition within the said range provides a higher effect, but if the amount of addition exceeds, the said range, lubricity in the molding process may be excessively elevated due to the interaction between said alcohol and the other additive or additives, resulting in reduced mixing effect and workability to make it impossible to attain the purpose of molding. Thus, it is desirable for practical use to add a polyhydric alcohol selected from the group consisting of sorbitol, mannitol, pentaerythritol, erythritol, arabitol, xylitol and dulcitol in an amount of less than 4 weight parts.

The amount of antimony trioxide used in combination with polyhydric alcohol in this invention should be within the range of 0.5 to 10 weight parts, preferably 2 to 5 weight parts, per 100 weight parts of said resin blend. Antimony trioxide has flame retardancy and is commonly used as a flame-retarding additive, so it may be preferably used in this invention in an amount of 5 to 10 weight parts in anticipation of such effect. Use of this substance within said amount range does not affect improvement of hydrolytic resistance intended in this invention.

As preferred examples of lead stabilizers usable in this invention, one may cite tribasic lead sulfate, tribasic lead phosphate, basic lead carbonate, basic lead sulfite, dibasic lead phosphite, dibasic lead stearate and dibasic lead maleate. The preferred range of amount of this lead stabilizer used in this invention is usually 0.1 to 5 weight parts based on 100 weight parts of said resin blend. The lead stabilizer may be added to a composition at any time before molding.

Although no particular restriction is placed on the mixing weight ratio between polyvinyl chloride resin and polyester-urethane resin used in this invention, usually an excellent hydrolysis inhibitory effect can be obtained when the mixing weight ratio of polyvinyl chloride resin to polyester-urethane resin is within the range of 30 : 70 to 99 : 1.

If need be, the polyblend composition of this invention may be added with various kinds of assistants such as other kinds of stabilizers than lead stabilizer, fillers, colorants, lubricants, plasticizers, etc., which are generally used in working of polyvinyl chloride resins. As additional stabilizers there may be used stearates such as calcium stearate, zinc stearate, barium stearate and cadmium stearate, a metal soap complex of cadmium-barium type, organic tin compounds such as dibutyl tin dilaurate, organic phosphites, and epoxide compounds such as epoxi-soy bean oil.

The moldings obtained from molding work of polyblend compositions consisting of polyvinyl chloride resin and polyester-urethane resin are possessed of both properties of polyvinyl chloride resins such as high weather and heat resistance, easy workability, etc., and properties of thermoplastic polyester-urethane resins such as toughness, wear resistance, solvent resistance, etc., so that such moldings are widely used for the articles required to have rubber-like elasticity, such as for example films, sheets, leather articles, belts, tubes, hoses, packings, wire coatings and other electric parts. The moldings obtained according to this invention can be also used for these applications.

Described in the following are reference examples of prior art and examples of this invention.

REFERENCE EXAMPLE 1

Polyester-urethane (Estane #5701 mfd. by B. F. Goodrich) was molded into strips with length of 10 cm, width of 3 cm and thickness of 1 mm, and treated in boiling water for 7 days. Although the molding surface after the treatment showed on tackiness detectable by finger touch, expandability has dropped with time. For instance, when the specimens one day after preparation were dried under vacuum and allowed to stand at 25° C for 1 day, retention of expandability (based on the pretest expandability standard) dropped to 70%, and 7 days later, it further dropped to 18%.

REFERENCE EXAMPLE 2

100 weight parts of polyester-urethane obtained by reacting a mixture of poly (1,6-hexanediol adipate) having molecular weight of 5,000 and two hydroxyl groups at both ends of each molecule and equivalent amount of ethylene glycol with 4,4'-diphenylmethane diisocyanate was mixed and kneaded with 100 weight parts of polyvinyl chloride resin (Zeon 101EP with polymerization degree of 1,350), 10 weight parts of tribasic lead sulfate and 2 weight parts of barium stearate on 160° C rolls to prepare a 3 mm thick sheet. This sheet was further flattened by a hot press to form a specimen with length of 10 cm, width of 3 cm and thickness of 1 mm, and this specimen was treated under the same conditions as used in Reference Example 1. As a result, surface tackiness was noticed one day after treatment due to advanced hydrolysis of polyurethane, and leaching of syrupy oligomer (deposited at the bottom of the test tube) was observed 7 days later.

A part of the specimen was dissolved in tetrahydrofuran to prepare a solution of 0.3% solids concentration, and this solution was subjected to a gel permeation chromatograph mfd. by Shimazu Seisakujo to measure the molecular weight.

The number-average molecular weight of the thus obtained polyurethane was approximately 20,000 before the test whereas that of the polyurethane remaining in the specimen after the test was 2,400. Retention of expandability of the specimen after the test was approximately 80%. This owes to the influence of polyvinyl chloride.

REFERENCE EXAMPLE 3

A similar test was conducted on the specimens prepared by adding 1 to 5 weight parts of 2,2'-dimethyl-diphenylcarbodiimide to 106 weight parts of the resin composition used in Reference Example 2. Although the results varied slightly depending on the amount of said additive added, any of the specimens developed surface tackiness 3 to 5 days after the treatment and suffered leaching of syrupy oligomer 7 days later, and no appreciable hydrolysis inhibitory effect by carbodiimide was noticed.

REFERENCE EXAMPLE 4

The same test was carried out on a specimen prepared by adding 3 weight parts of antimony trioxide (special grade chemical mfd. by Katayama Kagaku) to 106 weight parts of resin composition used in Reference Example 2, obtaining the completely same results as Reference Example 2.

REFERENCE EXAMPLE 5

The completely same results were also obtained in a similar test conducted on a specimen prepared by adding 2 weight parts of sorbitol to 106 weight parts of resin composition same as used in Reference Example 2.

EXAMPLE 1

A similar test was conducted on a specimen prepared by adding 0.5 weight parts of antimony trioxide and 0.5 weight parts of sorbitol to 106 weight parts of resin composition same as used in Reference Example 2, and surface tackiness of the specimens was examined after the test. A significant degree of improvement of surface tackiness was noted.

EXAMPLE 2

The same test was carried out on a specimen prepared by adding 3 weight parts of antimony trioxide and 2 weight parts of sorbitol to 106 weight parts of said resin composition.

The specimen showed no surface tackiness when measured 7 days and 14 days after the treatment, and the molecular weight of polyurethane in the specimen 7 days after the treatment was approximately 20,000.

EXAMPLE 3

A plasticized sheet specimen was prepared by adding 10 weight parts of Clay #30 and 10 weight parts of dioctyl phthalate to 106 weight parts of resin composition used in Reference Example 2, and this sheet was allowed to stand at the temperature of 80° C and relative humidity of 90 to 100% in a test room for 5 days, but it showed no surface tackiness and no drop of molecular weight.

EXAMPLE 4

100 weight parts of polyester-urethane obtained by reacting poly (1,6-hexanediol adipate) having molecular weight of 5,000 and two hydroxyl groups at both molecule ends with 4,4'-diphenylmethane diisocyanate was mixed and kneaded with 100 weight parts of polyvinyl chloride resin (Zeon 101EP, polymerization degree: 1,250), 10 weight parts of tribasic lead sulfate, 2 weight parts of barium stearate, 6 weight parts of antimony trioxide and 4 weight parts of sorbitol on the rolls of 160° C to prepare a 3 mm thick sheet, and then this sheet was flattened by a hot press to obtain a 10 cm long, 3 cm side and 1 mm thick specimen. This specimen was subjected to a 5-day treatment under the same conditions as used in Reference Example 3 but showed no surface tackiness and no drop of molecular weight.

EXAMPLE 5

There were prepared 10 cm long, 3 cm wide and 1 mm thick specimens from same resin compositions as used in Example 4 except for use of mannitol, pentaerythritol, erythritol, arabitol, xylitol and dulcitol, respectively, in place of sorbitol and under the same molding conditions as used in Example 4, and these specimens are allowed to stand at the temperature of 80° C and relative humidity of 90 to 100% in a test room for 5 days. The results showed that the specimens prepared by adding mannitol and pentaerythritol induced no surface tackiness and no drop of molecular weight like the specimen used in Example 4.

The embodiments of the invention in which an exclusive property or privilege is claimed are defined as follows:

1. A resin composition adapted for molding a product having improved resistance to hydrolysis, which composition has been prepared by the steps consisting essentially of adding (A) one or more polyhydric alcohols selected from the group consisting of sorbitol, mannitol, erythritol, arabitol, xylitol, dulcitol and pentaerythritol, and (B) antimony trioxide, to a mixture of (C) a blend of polyvinyl chloride resin and polyester-urethane resin, and (D) a lead stabilizer, and blending (A) and (B) into said mixture of (C) and (D), the amount of (A) being from b 0.1 to 4 parts by weight and the amount of (B) being from 0.5 to 10 parts by weight, per 100 parts by weight of (C).

2. A resin composition as claimed in claim 1, in which said lead stabilizer is selected from the group consisting of tribasic lead sulfate, tribasic lead phosphate, basic lead carbonate, basic lead sulfite, dibasic lead phosphite, dibasic lead stearate and dibasic lead maleate.

3. A resin composition as claimed in claim 1, in which the weight ratio of the polyvinyl chloride resin to the polyester-urethane resin is in the range of from 30:70 to 99:1 and the amount of the lead stabilizer (D) is from 0.1 to 5 parts by weight, per 100 parts by weight of (C).

4. A resin composition as claimed in claim 1, in which (A) consists of sorbitol.

5. A resin composition as claimed in claim 1, in which (A) consists of mannitol.

6. A resin composition as claimed in claim 1, in which (A) consists of erythritol.

7. A resin composition as claimed in claim 1, in which (A) consists of arabitol.

8. A resin composition as claimed in claim 1, in which (A) consists of xylitol.

9. A resin composition as claimed in claim 1, in which (A) consists of dulcitol.

10. A resin composition as claimed in claim 1, in which (A) consists of pentaerythritol.

11. A resin composition as claimed in claim 1, in which the amount of (A) is from 0.5 to 4 parts by weight and the amount of (B) is from 2 to 5 parts by weight; per 100 parts by weight of (C).

12. A molded product produced by molding the resin composition of claim 1.

* * * * *